United States Patent
Fukaya

(10) Patent No.: US 8,963,487 B2
(45) Date of Patent: Feb. 24, 2015

(54) POWER SUPPLY APPARATUS, POWER SUPPLY SYSTEM, CONTROL METHOD, AND STORAGE MEDIUM

(75) Inventor: Yudai Fukaya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 375 days.

(21) Appl. No.: 13/163,390

(22) Filed: Jun. 17, 2011

(65) Prior Publication Data

US 2012/0001592 A1    Jan. 5, 2012

(30) Foreign Application Priority Data

Jun. 30, 2010  (JP) ................. 2010-150262

(51) Int. Cl.
  *H02J 7/00* (2006.01)
  *H02J 5/00* (2006.01)

(52) U.S. Cl.
  CPC ...................... *H02J 5/005* (2013.01)
  USPC ........................................ 320/108

(58) Field of Classification Search
  USPC ............... 320/108; 340/854.6, 854.8, 870.31;
                      455/41.1, 573, 343.1
  See application file for complete search history.

(56) References Cited

U.S. PATENT DOCUMENTS

| | | | |
|---|---|---|---|
| 8,183,828 B2 * | 5/2012 | Tanabe .......................... | 320/108 |
| 8,234,509 B2 | 7/2012 | Gioscia et al. | |
| 2008/0258679 A1 | 10/2008 | Manico et al. | |
| 2009/0079387 A1 * | 3/2009 | Jin et al. ........................ | 320/108 |
| 2010/0009650 A1 * | 1/2010 | Orr et al. ..................... | 455/343.1 |
| 2010/0026236 A1 | 2/2010 | Kamiyama et al. | |
| 2010/0146308 A1 | 6/2010 | Gioscia et al. | |
| 2011/0018494 A1 | 1/2011 | Mita | |
| 2011/0018679 A1 | 1/2011 | Davis et al. | |
| 2011/0057606 A1 * | 3/2011 | Saunamaki .................. | 320/108 |
| 2011/0127953 A1 * | 6/2011 | Walley et al. ................. | 320/108 |
| 2011/0184842 A1 | 7/2011 | Melen | |
| 2011/0193688 A1 * | 8/2011 | Forsell ......................... | 340/10.4 |
| 2011/0221387 A1 | 9/2011 | Steigerwald et al. | |
| 2011/0316477 A1 | 12/2011 | Jung | |
| 2013/0147429 A1 * | 6/2013 | Kirby et al. ................... | 320/108 |

FOREIGN PATENT DOCUMENTS

| | | |
|---|---|---|
| CN | 101375483 A | 2/2009 |
| CN | 101447683 A | 6/2009 |
| CN | 101669265 A | 3/2010 |
| JP | 2007-089341 | 4/2007 |
| TW | 200937794 A | 9/2009 |

OTHER PUBLICATIONS

U.S. Application filed Jun. 17, 2011, U.S. Appl. No. 13/162,997.
Apr. 24, 2013 U.S. Office Action, that issued in related U.S. Appl. No. 13/162,997.

(Continued)

*Primary Examiner* — Richard V Muralidar
*Assistant Examiner* — David Henze-Gongola
(74) *Attorney, Agent, or Firm* — Cowan, Liebowitz & Latman, P.C.

(57) ABSTRACT

A power supply apparatus for supplying electric power wirelessly to a power receiving apparatus which charges a battery informs charging information indicating a charging state of the power receiving apparatus, if a position of the power receiving apparatus is changed to more than the predetermined value.

11 Claims, 5 Drawing Sheets

(56) References Cited

OTHER PUBLICATIONS

Nov. 18, 2013 U.S. Office Action, that issued in related U.S. Appl. No. 13/162,997.

Jun. 27, 2013 Chinese Office Action, that issued in Chinese Patent Application No. 201110184984. Jun. 2, 2013 Chinese Office Action, that issued in Chinese Patent Application No. 201110185038.7.

* cited by examiner

| APPARATUS ID | POSITION INFORMATION | CHARGING STATE |
|---|---|---|
| A | (3, 9) | STATE 1 |
| B | (8, 12) | STATE 2 |
| C | (16, 6) | STATE 3 |

POWER SUPPLY APPARATUS, POWER SUPPLY SYSTEM, CONTROL METHOD, AND STORAGE MEDIUM

BACKGROUND OF THE INVENTION

1. Field of the Invention

The present invention relates to a power supply apparatus which supplies electric power to a power receiving apparatus, a power supply system, a control method, and a storage medium.

2. Description of the Related Art

In recent years, a technique about a power supply system having a power receiving apparatus which charges a rechargeable battery, and a power supply apparatus which supplies electric power to the power receiving apparatus in a non-contact manner without any connection means such as a connector, is known. In such a non-contact power supply system, the power supply apparatus has a primary coil, and the power receiving apparatus has a secondary coil. The power supply apparatus supplies electric power to the power receiving apparatus in a non-contact manner using electromagnetic induction by the primary and secondary coils, and the power receiving apparatus charges a rechargeable battery by electric power supplied from the power supply apparatus.

A power supply apparatus which can supply electric power to a plurality of power receiving apparatuses placed on the power supply apparatus in such non-contact power supply system has been disclosed (Japanese Patent Laid-Open No. 2007-89341).

However, for example, when the power supply apparatus supplies electric power to the plurality of power receiving apparatuses, the user cannot recognize the charging states of the plurality of power receiving apparatuses. For this reason, the user cannot detect whether or not charging of a desired power receiving apparatus is complete.

SUMMARY OF THE INVENTION

The present invention allows the user to detect a charging state of a desired power receiving apparatus.

According to an aspect of the present invention, there is provided a power supply apparatus for supplying electric power wirelessly to a power receiving apparatus, the power supply apparatus comprising: a detection unit that detects whether or not a position of the power receiving apparatus is changed to more than a predetermined value; and a control unit that controls an informing unit to inform charging information indicating a charging state of the power receiving apparatus, if the position is changed to more than the predetermined value.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

Figure 1:
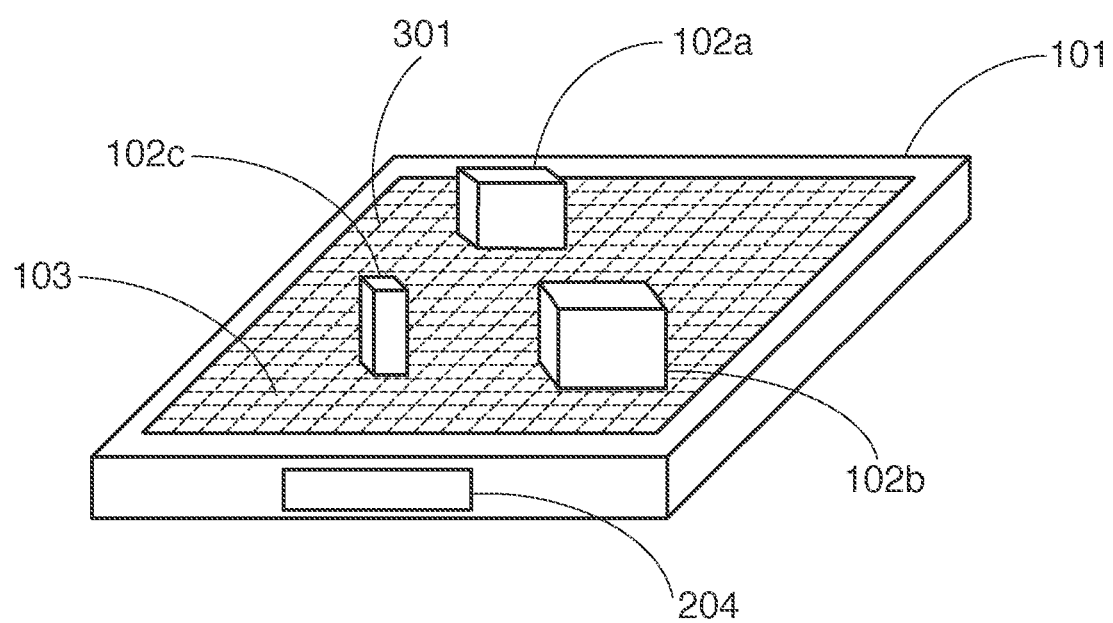
FIG. 1 is a perspective view showing an example of a power supply system according to an embodiment of the present invention.

FIG. 1 is a perspective view showing a non-contact power supply system according to an embodiment of the present invention. The non-contact power supply system has a power supply apparatus 101 which supplies electric power in a non-contact manner, and a plurality of power receiving apparatuses 102a to 102c which charge their rechargeable batteries (secondary batteries) by using electric power supplied from the power supply apparatus 101. The plurality of power receiving apparatuses 102a to 102c shown in FIG. 1 include a mobile phone 102a, digital camera 102b, and digital video camera 102c. The mobile phone 102a, digital camera 102b, and digital video camera 102c respectively have rechargeable batteries which are charged by using electric power received from the power supply apparatus 101 in a non-contact manner. The power supply apparatus 101 can simultaneously supply electric power to the mobile phone 102a, digital camera 102b, and digital video camera 102c in a non-contact manner. The power receiving apparatuses 102a to 102c can be placed on a power supply area 103 on its supper surface of the power supply apparatus 101. The power supply apparatus 101 can simultaneously supply electric power to one or a plurality of power receiving apparatuses 102a to 102c placed within the power supply area 103.

The power supply apparatus 101 has a display unit 204 which displays a charging state of one of the mobile phone 102a, digital camera 102b, and digital video camera 102c placed on the power supply area 103. Note that the power supply area 103 is a predetermined range in which the power supply apparatus 101 can supply electric power to the plurality of power receiving apparatuses 102a to 102c (that is, a predetermined range in which the plurality of power receiving apparatuses 102a to 102c can receive electric power from the power supply apparatus 101). The plurality of power receiving apparatuses 102a to 102c which exist within the power supply area 103 of the power supply apparatus 101 can charge their rechargeable batteries by electric power supplied from the power supply apparatus 101. Since the plurality of power receiving apparatuses 102a to 102c which do not exist within the power supply area 103 of the power supply apparatus 101 cannot receive electric power supplied from the power supply apparatus 101, they cannot charge their rechargeable batteries.

Assume that when the plurality of power receiving apparatuses 102a to 102c are placed within the power supply area 103 of the power supply apparatus 101, they exist within the power supply area 103. Also, assume that when the plurality of power receiving apparatuses 102a to 102c are not placed within the power supply area 103 of the power supply apparatus 101, they do not exist within the power supply area 103.

Figure 2:
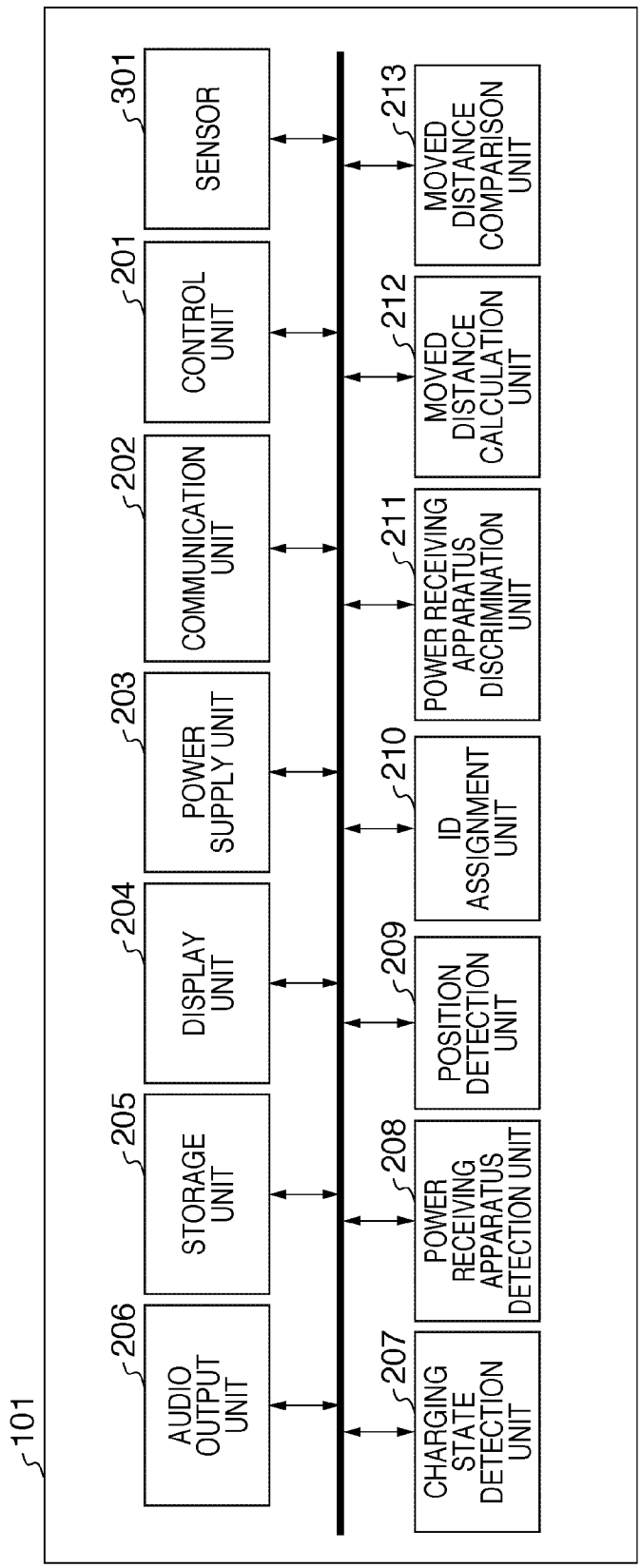
FIG. 2 is a block diagram showing an example of a power supply apparatus according to the embodiment of the present invention.

FIG. 2 is a block diagram showing the power supply apparatus 101. The power supply apparatus 101 has a control unit 201, a communication unit 202, a power supply unit 203, the display unit 204, a storage unit 205, an audio output unit 206, a charging state detection unit 207, a power receiving apparatus detection unit 208, and a position detection unit 209. Furthermore, the power supply apparatus 101 has an ID assignment unit 210, power receiving apparatus discrimination unit 211, moved distance calculation unit 212, moved distance comparison unit 213, and sensor 301.

The control unit 201 has, for example, a CPU, RAM, and ROM, and controls the respective units of the power supply apparatus 101 when the CPU executes programs stored in the ROM.

The communication unit 202 is controlled by the control unit 201, and makes wireless communications with the plurality of power receiving apparatuses 102a to 102c by a wireless communication method such as a wireless LAN or near field wireless communication. The communication unit 202 can also acquire, from the power receiving apparatuses 102a to 102c, charging state information indicating charging states of the power receiving apparatuses 102a to 102c. The communication unit 202 supplies the charging state information acquired from one of the plurality of power receiving apparatuses 102a to 102c to the charging state detection unit 207. The communication unit 202 can also transmit charging start information required to start charging to the power receiving apparatuses 102a to 102c. In this embodiment, the communication unit 202 individually communicates with the power receiving apparatuses 102a to 102c using a communication method of the wireless LAN communication standard such as IEEE802.11a, b, or g. Note that the communication unit 202 may communicate with the power receiving apparatuses 102a to 102c by a communication method other than the communication method of the wireless LAN communication standard such as IEEE802.11a, b, or g.

The power supply unit 203 begins to supply electric powers to the plurality of power receiving apparatuses 102a to 102c placed on the power supply area 103 in a non-contact manner after the communication unit 202 transmits the charging start information to them. Thus, the power receiving apparatuses 102a to 102c, which received the charging start information, begin to charge their rechargeable batteries. "Non-contact power supply" in this embodiment is a power supply method which performs power transmission from the power supply apparatus 101 to the plurality of power receiving apparatuses 102a to 102c without any contacts such as connectors and terminals. As the non-contact power supply method in this embodiment, an electromagnetic induction type will be exemplified. Alternatively, a non-contact power supply method other than the electromagnetic induction type, that is, one of electric field resonance type, resonant magnetic coupling type, and electric wave type may be used.

The power supply unit 203 has a plurality of power supply zones 103a to 103c on the power supply area 103, and can independently control power supply operations for respective power supply zones 103a to 103c. When the electromagnetic induction type is adopted as the non-contact power supply method, a plurality of primary coils are arranged in correspondence with the power supply zones 103a to 103c, and the power supply unit 203 individually controls electric powers to be supplied to the power receiving apparatuses 102a to 102c on the individual power supply zones 103a to 103c. Note that the control unit 201 can individually control electric powers to be supplied to the power receiving apparatuses 102a to 102c by associating pieces of identification information (apparatus IDs) acquired from the power receiving apparatuses 102a to 102c with the power supply zones 103a to 103c.

Note that when the resonant magnetic coupling type is adopted as the non-contact power supply method, a plurality of antennas are arranged in correspondence with the power supply zones 103a to 103c, and the power supply unit 203 individually controls electric powers on the individual power supply zones 103a to 103c.

The display unit 204 includes, for example, a liquid crystal display or LED, and displays charging states of the power receiving apparatuses 102a to 102c. Also, the display unit 204 displays, for example, apparatus IDs of the power receiving apparatuses 102a to 102c placed on the power supply area 103 in addition to the charging states of the power receiving apparatuses 102a to 102c.

The storage unit 205 is used as a work area required for the control unit 201 to execute programs, and as an area used to store information received when the communication unit 202 performs a wireless communication.

Assume that the storage unit 205 stores a charging state table which indicates the charging states of the power receiving apparatuses 102a to 102c. The charging state table is a data table which stores the apparatus ID of one of the power receiving apparatuses 102a to 102c, power consumption of one of the power receiving apparatuses as a power supply target detected by the charging state detection unit 207, and the charging state of one of the power receiving apparatuses 102a to 102c in association with each other. The charging state in the charging state table corresponds to one of states 1 to 4 shown in FIG. 3 to be described later. The charging state table may be stored in advance in the storage unit 205 or the control unit 201 may generate that table according to the apparatus ID acquired from one of the power receiving apparatuses 102a to 102c and the power consumption detected by the charging state detection unit 207.

When the control unit 201 generates the charging state table, it may delete information such as the apparatus ID and power consumption associated with a power receiving apparatus, which does not receive a power supply start instruction from the power supply apparatus 101, from the charging state table. The control unit 201 deletes information such as the apparatus ID and power consumption associated with a power receiving apparatus, which does not receive a power supply start instruction from the power supply apparatus 101, from the charging state table.

The audio output unit 206 includes, for example, a loudspeaker. The audio output unit 206 outputs audio data corresponding to the charging state of one of the power receiving apparatuses 102a to 102c.

The charging state detection unit 207 detects power consumption consumed by one of the power receiving apparatuses 102a to 102c selected as a power supply target when the power supply unit 203 supplies electric powers to the power receiving apparatuses 102a to 102c. Note that power consumption consumed by one of the power receiving apparatuses 102a to 102c when the power supply unit 203 supplies electric powers are electric power used to charge their rechargeable batteries in the power receiving apparatuses 102a to 102c. The charging state detection unit 207 also detects charging state of the power receiving apparatus as a power supply target based on the detected power consumption.

Detection of the charging state of the power receiving apparatus 102 will be described below. A case will be exemplified below wherein the power supply unit 203 supplies electric power to the power receiving apparatus 102a.

Figure 3:
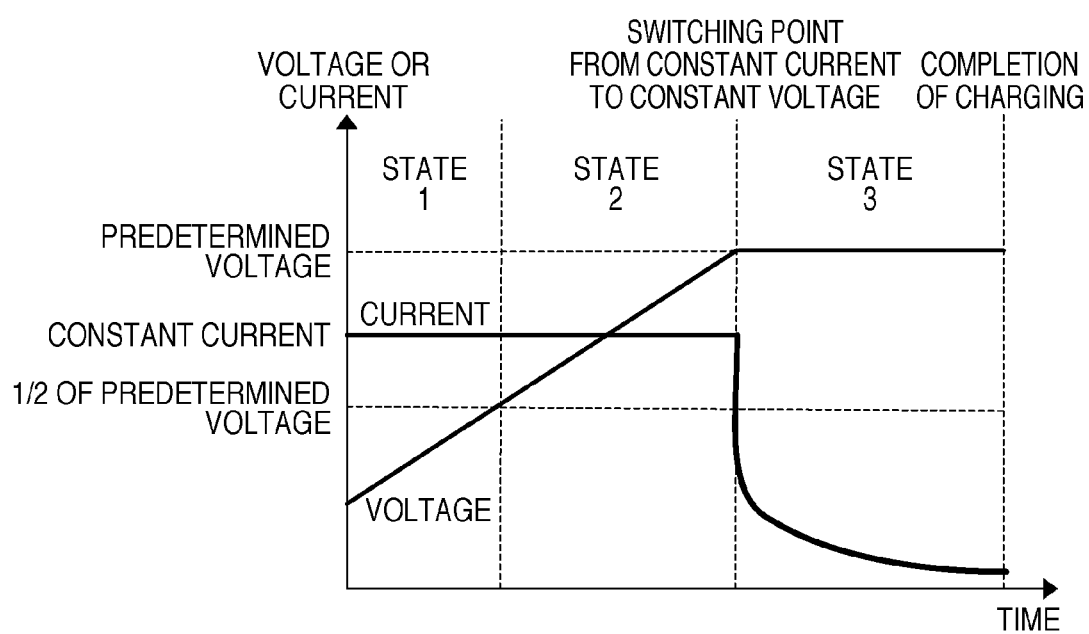
FIG. 3 is a graph showing charging states of the power supply apparatus according to the embodiment of the present invention.

FIG. 3 is a graph showing an example of temporal changes in current and voltage to be supplied to a rechargeable battery 409a in the power receiving apparatus 102a when the power supply unit 203 supplies electric power to the power receiving apparatus 102a as a power supply target. Note that a voltage required for the power receiving apparatus 102a as a power supply target to charge the rechargeable battery 409a by using electric power supplied from the power supply apparatus 101 will be referred to as "charging voltage" hereinafter, and a current required for the power receiving apparatus 102a to charge the rechargeable battery 409a will be referred to as "charging current" hereinafter. The abscissa of FIG. 3 represents a time axis which indicates an elapsed time elapsed since the communication unit 202 transmits the charging start information, and the ordinate of FIG. 3 is a current axis which indicates a charging current value and a voltage axis which indicates a charging voltage value.

When the power supply apparatus 101 transmits the charging start information to the power receiving apparatus 102a as a power supply target, and starts a power supply operation to the power receiving apparatus 102a, the power receiving apparatus 102a executes constant current control required to control a charging current supplied to the rechargeable battery 409a to have a predetermined current value. When the power receiving apparatus 102a executes the constant current control, a charging voltage supplied to the rechargeable battery 409a rises along with an elapse of the elapsed time. When the charging voltage to the rechargeable battery 409a is equal to or more than a predetermined voltage value after the constant current control, the power receiving apparatus 102a executes constant voltage control required to control the charging voltage to the rechargeable battery 409a to have a predetermined voltage value. When the power receiving apparatus 102a executes the constant voltage control, the charging current supplied to the rechargeable battery 409a falls along with an elapse of the time. Upon completion of charging of the rechargeable battery 409a in the power receiving apparatus 102a as a power supply target, a value of the charging current supplied to the rechargeable battery 409a becomes nearly zero. In this way, the power receiving apparatus 102a consumes power consumption according to the product of the charging current and charging voltage so as to charge the rechargeable battery 409a. The charging state detection unit 207 can detect power consumption consumed by the power receiving apparatus 102a, and can detect a charging state indicating charging of the rechargeable battery 409a by the power receiving apparatus 102a as a power supply target in accordance with the detected power consumption.

The charging state includes four states. Note that these four states will be described below.

In the first embodiment, as shown in FIG. 3, when the power receiving apparatus 102a executes the constant current control, a state in which the charging voltage assumes a value less than a half of a predetermined voltage value is defined as "state 1". When the power receiving apparatus 102a executes the constant current control, a state in which the charging voltage assumes a value which is equal to or larger than the half of the predetermined voltage value and is less than the predetermined voltage value is defined as "state 2". When the power receiving apparatus 102a executes the constant voltage control, a state in which the charging voltage assumes a value equal to or larger than the predetermined voltage value is defined as "state 3". When the power receiving apparatus 102a executes the constant voltage control, a state in which the charging current is equal to or less than a current value indicating completion of charging is defined as a "state 4 (completion of charging)". In this way, the charging state detection unit 207 can determine one of the four states as the charging state of the power receiving apparatus 102a as a power supply target according to the power consumption consumed by the power receiving apparatus 102a.

Note that the predetermined current value and predetermined voltage value are those which are decided by the power receiving apparatus 102a, and the power receiving apparatus 102a controls charging by changing the predetermined current value and predetermined voltage value. A current value indicating completion of charging assumes a value nearly equal to zero, and is decided by the power receiving apparatus 102a. For example, when the detected power consumption is nearly zero, the charging state detection unit 207 determines that the charging state of the power receiving apparatus as a power supply target is "state 4". Note that the predetermined current value and predetermined voltage value may be decided in advance or may be changed when the user operates the power receiving apparatus 102a. Note that the power receiving apparatuses 102b and 102c perform charging in the same manner as in the power receiving apparatus 102a, and the charging state detection unit 207 can detect a charging state of one of the power receiving apparatuses 102b and 102c as in the power receiving apparatus 102a.

Also, when the charging state detection unit 207 receives charging state information received by the communication unit 202, it analyzes the charging state information, and can detect a charging state of a power receiving apparatus based on the analysis result.

The power receiving apparatus detection unit 208 detects using the sensor 301 that one of the power receiving apparatuses 102a to 102c exists on the power supply area 103 of the power supply apparatus 101 at least. The sensor 301 can detect that one of the power receiving apparatuses 102a to 102c is placed on the power supply area 103 of the power supply apparatus 101, and can detect the position where one of the power receiving apparatuses 102a to 102c is placed. FIG. 1 illustrates one position of the power receiving apparatuses 102a to 102c, which can be detected by the sensor 301, as a grid pattern. However, assume that the sensor 301 of the power supply apparatus 101 cannot be externally visually confirmed. The sensor 301 may include, for example, a photosensor or capacitance sensor.

When the power receiving apparatus detection unit 208 detects that one of the power receiving apparatuses 102a to 102c exists on the power supply area 103 of the power supply apparatus 101, the position detection unit 209 detects the position, on the power supply area 103, of the detected one of the power receiving apparatuses 102a to 102c. At this time, the position detection unit 209 detects the position, on the power supply area 103, of one of the power receiving apparatuses 102a to 102c using the sensor 301.

For example, when the sensor 301 includes transmission type photosensors arranged in a matrix, if the power receiving apparatus 102a is placed on the power supply area 103, a region where the power receiving apparatus 102a is placed is shielded. Hence, the sensor 301 can detect the existence of the power receiving apparatus 102a. When the power receiving apparatus detection unit 208 detects using the sensor 301 that the power receiving apparatus 102a exists on the power supply area 103, the control unit 201 controls the communication unit 202 to perform a communication required to confirm if an object which exists on the power supply area 103 is the power receiving apparatus 102a. When the object which exists on the power supply area 103 responds to the communication of the communication unit 202, the control unit 201 determines that the object which exists on the power supply area 103 is a chargeable power receiving apparatus.

Then, the position detection unit 209 detects the position on the power supply area 103 where the power receiving apparatus 102a is placed. For example, the sensor 301 detects the region shielded by the power receiving apparatus 102a, and detects the central position of that region as the position of the power receiving apparatus 102a. Note that the region of the sensor 301 shielded by the power receiving apparatus 102a is a set of ranges where grid points of the sensor 301 are continuously shielded.

The ID assignment unit 210 assigns an apparatus ID (identification information) to each of the power receiving apparatuses 102a to 102c, the positions of which are detected by the position detection unit 209.

The power receiving apparatus discrimination unit 211 discriminates the apparatus ID of one of the power receiving apparatuses 102a to 102c, which is selected by the user.

The moved distance calculation unit 212 calculates a moved distance of one of the power receiving apparatuses 102a to 102c, which has the apparatus ID discriminated by the power receiving apparatus discrimination unit 211, by detecting a variation in position information detected by the position detection unit 209 in accordance with the position information detected by the position detection unit 209.

When the plurality of power receiving apparatuses 102a to 102c exist on the power supply area 103, the moved distance comparison unit 213 compares moved distances of the power receiving apparatuses 102a to 102c, which are individually calculated by the moved distance calculation unit 212.

The power receiving apparatus 102a has, for example, a control unit 401a, a communication unit 402a, a power receiving unit 403a, a storage unit 404a, and a charging unit 405a (none of them are shown).

The control unit 401a has, for example, a CPU, RAM, and ROM, and controls the respective units of the power receiving apparatus 102a when the CPU executes programs stored in the ROM.

The communication unit 402a is controlled by the control unit 401a, performs a wireless communication with the power supply apparatus 101 via, for example, a wireless LAN, and can receive charging start information and charging stop information transmitted from the power supply apparatus 101.

When the communication unit 402a receives the charging start information, the power receiving unit 403a receives electric power supplied from the power supply unit 203 of the power supply apparatus 101, and supplies the received electric power to the charging unit 405a.

The storage unit 404a is used as a work area required for the control unit 401a to execute programs, and as an area used to store information received when the communication unit 402a performs a wireless communication.

The charging unit 405a supplies electric power received by the power receiving unit 403a to the rechargeable battery 409a attached to the power receiving apparatus 102a, thereby charging the rechargeable battery 409a. The charging unit 405a executes the constant current control and constant voltage control for the rechargeable battery 409a.

Note that the arrangement of the power receiving apparatus 102a has been described. However, assume that the power receiving apparatuses 102b and 102c also have the same arrangement as that of the power receiving apparatus 102a.

Figure 4:
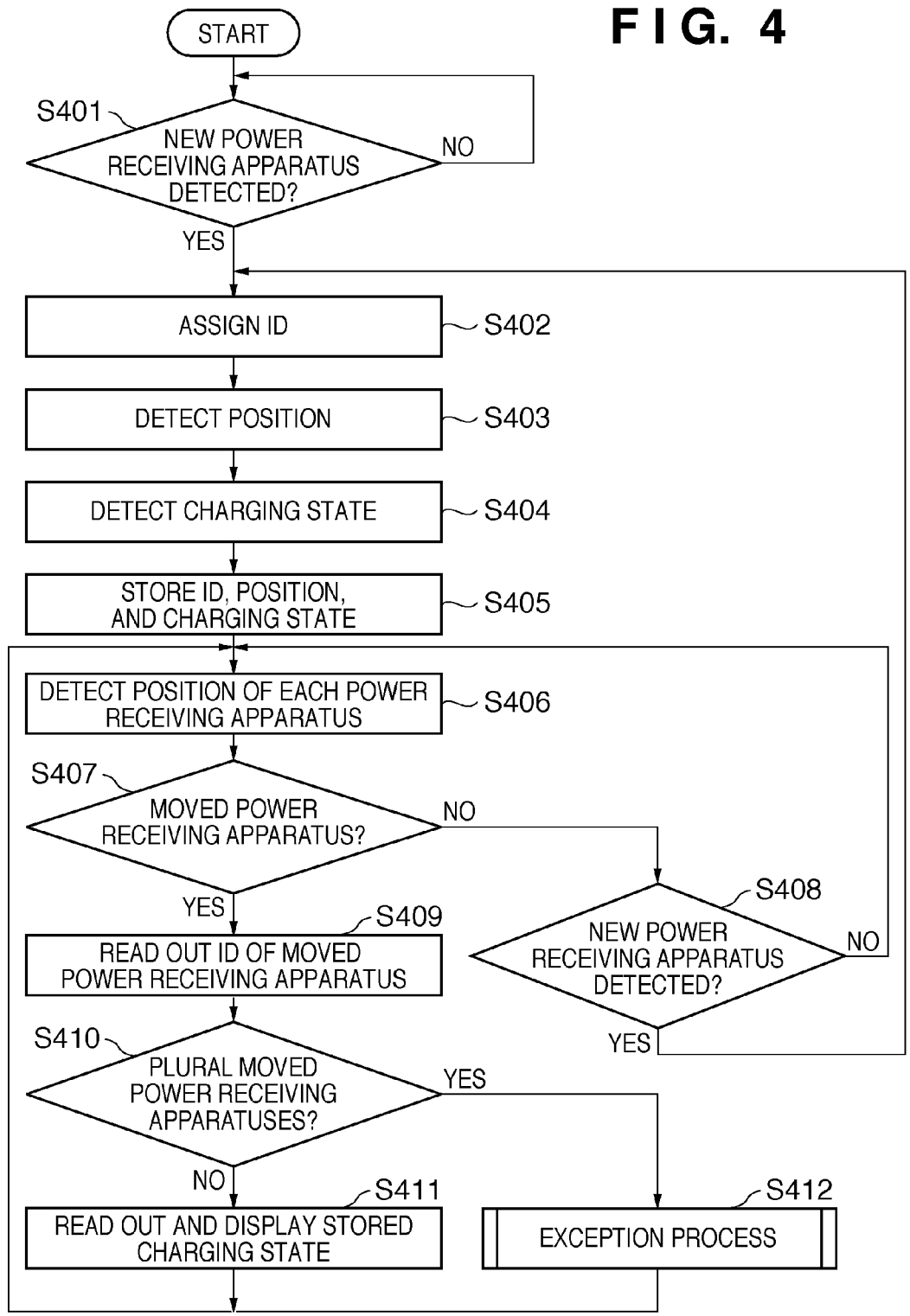
FIG. 4 is a flowchart for explaining an example of display process executed by the power supply apparatus according to the embodiment of the present invention.

FIG. 4 is a flowchart for explaining display process executed when the power supply apparatus 101 of this embodiment displays a charging state of one of the power receiving apparatuses 102a to 102c placed on the power supply area 103. The power supply apparatus 101 of this embodiment displays a charging state of one power receiving apparatus, the motion of which has been detected, of the power receiving apparatuses 102a to 102c placed on the power supply area 103. Thus, even when the plurality of power receiving apparatuses 102a to 102c are placed on the power supply area 103, the user can detect a charging state of a desired power receiving apparatus by moving, on the power supply area 103, that apparatus, the charging state of which is to be detected. Note that as an example for explaining the display process, a case will be exemplified below wherein the power receiving apparatus 102a is placed in a state in which none of the power receiving apparatuses 102a to 102c are placed on the power supply area 103.

If the power supply apparatus 101 is in a power supply mode, the control unit 201 determines in step S401 whether or not the power receiving apparatus detection unit 208 detects that the power receiving apparatus 102a is newly placed on the power supply area 103. If the control unit 201 determines that the power receiving apparatus detection unit 208 detects that the power receiving apparatus 102a is placed on the power supply area 103, this process advances from step S401 to step S402. If the control unit 201 determines that the power receiving apparatus detection unit 208 does not detect that the power receiving apparatus 102a is placed on the power supply area 103, this process returns from step S401 to step S401.

In step S402, the control unit 201 controls the ID assignment unit 210 to assign a unique apparatus ID to the power receiving apparatus 102a detected in step S401. Note that the apparatus ID assigned to the power receiving apparatus 102a by the ID assignment unit 210 is stored in the storage unit 205 in association with the power receiving apparatus 102a. When the ID assignment unit 210 assigns the apparatus ID to the power receiving apparatus 102a, this process advances from step S402 to step S403.

In step S403, the control unit 201 controls the position detection unit 209 to detect the position of the power receiving apparatus 102a detected in step S401. When the position detection unit 209 detects the position of the power receiving apparatus 102a, this process advances from step S403 to step S404.

In step S404, the control unit 201 controls the charging state detection unit 207 to detect a charging state of the power receiving apparatus 102a detected in step S401. After the charging state detection unit 207 detects power consumption consumed by the power receiving apparatus 102a to which the apparatus ID is assigned, the charging state of the power receiving apparatus 102a is detected based on the power consumption of the power receiving apparatus 102a. The charging state of the power receiving apparatus can be detected by refer to the charging state table stored in the storage unit 205 based on the power consumption detected by the charging state detection unit 207. As another detection method of the charging state of the power receiving apparatus, the communication unit 202 may receive charging state information from the power receiving apparatus 102a, and the charging state detection unit 207 may detect the charging state of the power receiving apparatus 102a based on the charging state information acquired from the power receiving apparatus 102a by the communication unit 202. Note that the charging state information includes a charging capacity of the rechargeable battery 409a of the power receiving apparatus 102a, and a time period required until the rechargeable battery 409a is fully charged, which are detected by the power receiving apparatus 102a.

In step S405, the control unit 201 stores, in the storage unit 205, the apparatus ID assigned to the power receiving apparatus 102a in step S402, position information indicating the position of the power receiving apparatus 102a detected in step S403, and information indicating the charging state of the power receiving apparatus 102a detected in step S404 in association with each other. Note that in this case, the control unit 201 may store, in the storage unit 205, pieces of unique information (for example, a MAC address, subscriber number, serial number, etc.) of the power receiving apparatus 102a acquired from the power receiving apparatus 102a in association with each other, in addition to the apparatus ID, position information, and information indicating the charging state.

The aforementioned processes in steps S401 to S405 are executed every time a new power receiving apparatus is detected even when the power receiving apparatus 102b or 102c is newly detected on the power supply area 103. Note that the control unit 201 stores, in the storage unit 205, the apparatus ID assigned to the power receiving apparatus 102a, position information indicating the position of the power receiving apparatus 102a, and information indicating the charging state of the power receiving apparatus 102a in association with each other in step S405. In this case, the control unit 201 controls the communication unit 202 to transmit charging start information to the power receiving apparatus 102a, and controls the power supply unit 203 to supply electric power to the power receiving apparatus 102a. In this case, this process advances from step S405 to step S406.

In step S406, the control unit 201 controls the position control unit 209 to detect the positions of all the power receiving apparatuses corresponding to the apparatus IDs stored in the storage unit 205. Note that when the power receiving apparatuses 102a to 102c are placed on the power supply area 103, the position detection unit 209 detects pieces of position information of all the power receiving apparatuses 102a to 102c. Note that the position detection unit 209 may detect the positions of the power receiving apparatuses at a predetermined cycle (for example, once per several sec) in addition to a request from the control unit 201. When the position detection unit 209 detects the positions of the power receiving apparatuses at the predetermined cycle, step S406 may be omitted. Also, in step S406 the control unit 201 controls the charging state detection unit 207 to detect the charging states of all the power receiving apparatuses corresponding to the apparatus IDs stored in the storage unit 205. The charging state detection unit 207 may detect the charging states of the power receiving apparatuses at a predetermined cycle in addition to a request from the control unit 201 as in detection of the positions, thereby updating the charging states of the power receiving apparatuses stored in the storage unit 205 to the latest states. Note that the charging state of the power receiving apparatus whose charging state reaches a full charging or highest level need not be updated. When the position detection unit 209 detects the positions of the power receiving apparatuses at the predetermined cycle, and the charging state detection unit 207 detects the charging states of the power receiving apparatuses at the predetermined cycle, step S406 may be omitted. When the position detection unit 209 detects the positions of all the power receiving apparatuses corresponding to the apparatus IDs stored in the storage unit 205, this process advances from step S406 to step S407.

In step S407, the control unit 201 controls the power receiving apparatus discrimination unit 211 to determine whether or not one of the power receiving apparatuses placed on the power supply area 103 is moved at least. For example, when the power receiving apparatus 102a is placed on the power supply area 103, the power receiving apparatus discrimination unit 211 compares the position of the power receiving apparatus 102a detected by the position detection unit 209 in step S406 and that of the power receiving apparatus 102a stored in the storage unit 205. As a result of comparison by the power receiving apparatus discrimination unit 211, the control unit 201 determines whether or not one of the power receiving apparatuses placed on the power supply area 103 is moved at least by determining whether or not a variation in position of the power receiving apparatus 102a is equal to or larger than a predetermined value. Note that the variation in position of the power receiving apparatus is, for example, a moved distance of the power receiving apparatus. As a result of comparison by the power receiving apparatus discrimination unit 211, when the variation in position of the power receiving apparatus 102a is equal to or larger than the predetermined value, the control unit 201 determines that one of the power receiving apparatuses placed on the power supply area 103 is moved. As a result of comparison by the power receiving apparatus discrimination unit 211, when the variation in position of the power receiving apparatus 102a is not equal to or larger than the predetermined value, the control unit 201 determines whether or not a variation in position of another power receiving apparatus is equal to or larger than the predetermined value. In this case, when the variations in position of all the power receiving apparatuses are not equal to or larger than the predetermined value, the control unit 201 determines that all the power receiving apparatuses placed on the power supply area 103 are not moved. Note that when the variation in position of the power receiving apparatus is the moved distance of the power receiving apparatus, the predetermined value corresponds to a predetermined distance.

When the control unit 201 determines that one of the power receiving apparatuses placed on the power supply area 103 is moved at least, this process advances from step S407 to S409. When the control unit 201 determines that the power receiving apparatuses placed on the power supply area 103 are not moved, this process advances from step S407 to S408.

The control unit 201 determines in step S408 whether or not the power receiving apparatus detection unit 208 detects that a new power receiving apparatus is placed on the power supply area 103, as in step S401. When the control unit 201 determines that the power receiving apparatus detection unit 208 detects that the new power receiving apparatus is placed on the power supply area 103, this process returns from step S408 to step S402. The ID assignment unit 210 assigns a new apparatus ID to the newly detected power receiving apparatus. Note that the new apparatus ID is that which does not overlap the apparatus IDs of other power receiving apparatuses. When the control unit 201 determines that the power receiving apparatus detection unit 208 does not detect that a new power receiving apparatus is placed on the power supply area 103, this process returns from step S408 to step S406.

In step S409, the control unit 201 reads out all the apparatus IDs of the moved power receiving apparatuses, which are determined in step S407, from the storage unit 205. When the apparatus IDs of the power receiving apparatuses are read out from the storage unit 205, this process advances from step S409 to step S410.

The control unit 201 determines in step S410 based on the apparatuses IDs read out from the storage unit 205 in step S409 whether or not a plurality of moved power receiving apparatuses are determined in step S407. When a plurality of moved power receiving apparatuses are determined in step S407, this process advances from step S410 to step S412. If one moved power receiving apparatus is determined in step S407, this process advances from step S410 to step S411.

In step S411, the control unit 201 reads out information indicating the charging state corresponding to the apparatus ID read out from the storage unit 205 in step S409 from the storage unit 205, and controls the display unit 204 to display the read out information indicating the charging state. The control unit 201 generates information required to display the charging state on the display unit 204 based on the information indicating the charging state read out from the storage unit 205, and controls the display unit 204 to display this information. Note that the information required to display the charging state on the display unit 204 is information such as character data or an icon that indicates the charging state of the power receiving apparatus. Also, for example, when the display unit 204 includes three LEDs, and the charging state of the power receiving apparatus is a full charging state, the control unit 201 controls the display unit 204 to flicker all the three LEDs of the display unit 204. In this case, when the charging state of the power receiving apparatus is not a full charging state, the control unit 201 may control the display unit 204 to turn on one or two LEDs of the display unit 204 in accordance with the charging state, that is, one of states "1" to "4". When the charging state is state "1", the control unit 201 controls the display unit 204 to turn on one LED of the display unit 204. When the charging state is state "2", the control unit 201 controls the display unit 204 to turn on two LEDs of the display unit 204. When the charging state is state "3", the control unit 201 controls the display unit 204 to turn on three LEDs of the display unit 204. Note that of states "1" to "3" as the charging state, state "3" corresponds to a highest charging ratio.

For example, when the display unit 204 includes one LED, the control unit 201 controls the display unit 204 to change an ON color of the LED of the display unit 204. In this case, when the charging state of the power receiving apparatus is a full charging state, the control unit 201 may control the display unit 204 to turn on the LED of the display unit 204 in orange. Also, in this case, when the charging state of the power receiving apparatus is not a full charging state, the control unit 201 may control the display unit 204 to turn on the LED of the display unit 204 in green.

Furthermore, for example, when the display unit 204 includes a display device such as a liquid crystal display, and can display character data, the apparatus ID may be displayed together with character data required to display the charging state of the power receiving apparatus.

When the display unit 204 displays information required to inform the charging state of the moved power receiving apparatus, this process returns from step S411 to step S406.

In step S412, the control unit 201 executes exception process. This exception process is executed when a plurality of power receiving apparatuses have been moved. The exception process will be described below.

Figures 5, 6:
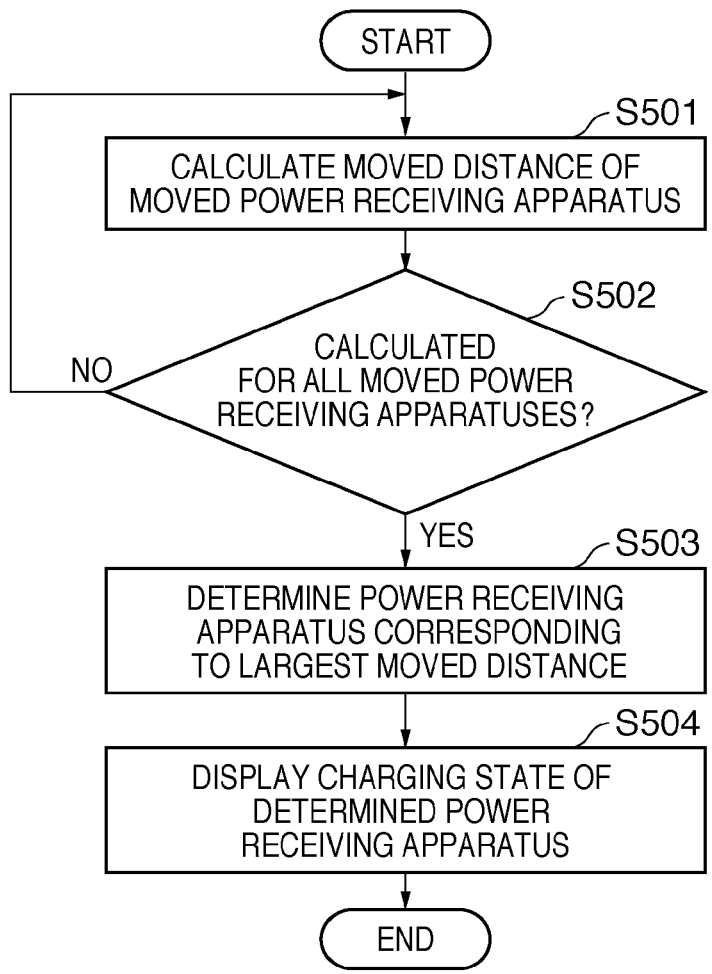
FIG. 5 is a flowchart for explaining an example of exception process executed by the power supply apparatus according to the embodiment of the present invention.
FIG. 6 is a table showing an example of position information and charging state information for each power receiving apparatus stored in a storage unit in step S405 in FIG. 4.

FIG. 5 is a flowchart for explaining the exception process executed by the control unit 201 in step S412 of the flowchart shown in FIG. 4.

In step S501, the control unit 201 controls the moved distance calculation unit 212 to calculate moved distances of the respective power receiving apparatuses in accordance with pieces of position information of the power receiving apparatuses corresponding to the plurality of apparatus IDs read out in step S409, and those detected by the position detection unit 209. Note that the pieces of position information of the power receiving apparatuses corresponding to the plurality of apparatus IDs read out in step S409 are those which are stored in the storage unit 205. The moved distance calculation unit 212 calculates a moved distance of each power receiving apparatus by detecting a variation in position information detected by the position detection unit 209, and outputs a calculation result to the moved distance comparison unit 213. When the moved distance of the power receiving apparatus is calculated, this process advances from step S501 to step S502.

The control unit 201 determines in step S502 whether or not the moved distance calculation unit 212 has calculated the moved distances of all the power receiving apparatuses corresponding to the plurality of apparatus IDs read out in step S409. When the moved distance calculation unit 212 has calculated the moved distances of all the power receiving apparatuses corresponding to the plurality of apparatus IDs read out in step S409, this process advances from step S502 to S503. When the moved distance calculation unit 212 has not calculated the moved distances of all the power receiving apparatuses corresponding to the plurality of apparatus IDs read out in step S409 yet, this process returns from step S502 to step S501.

In step S503, the control unit 201 controls the moved distance comparison unit 213 to compare each other the moved distance of the power receiving apparatus, which are determined to be moved. When the moved distance comparison unit 213 compares all the distance of the power receiving apparatus, the control unit 201 detects a power receiving apparatus corresponding to a largest moved distance, and determines that the charging state of this power receiving apparatus is displayed on the display unit 204. Note that this determination is an example of a method of selecting one of the power receiving apparatuses, which are determined to have moved distances equal to or larger than the predetermined value, so as to display the charging state of that apparatus. For example, when it is determined that the moved distance of a certain power receiving apparatus is apparently excessively larger than other power receiving apparatuses, the user is more likely to bring out that apparatus from the power supply area 103. In this case, such power receiving apparatus which is determined to have an apparently excessively larger moved distance than other power receiving apparatuses may be excluded, and one of the remaining power receiving apparatuses, which has a largest moved distance, may be selected. In this case, the power receiving apparatus to be selected is that which has the second or subsequent largest moved distance. A power receiving apparatus which is determined to have an apparently excessively larger moved distance than other power receiving apparatuses is, for example, that which is determined to have a moved distance larger than one of a width or length of the power supply area 103. When the control unit 201 detects the power receiving apparatus corresponding to the largest moved distance, this process advances from step S503 to step S504.

In step S504, the control unit 201 reads out information indicating the charging state corresponding to the power receiving apparatus having the largest moved distance from the storage unit 205, and displays the read out information indicating the charging state on the display unit 204 as in step S411. When the information indicating the charging state corresponding to the power receiving apparatus having the largest moved distance is displayed on the display unit 204, this process ends, thus ending the exception process executed in step S412. When the exception process is executed, this process returns from step S412 to step S406.

Note that the control unit 201 may output audio data via the audio output unit 206 as information indicating the charging state of the power receiving apparatus in step S411 or S504. In this case, the control unit 201 outputs audio data according to the charging state of the power receiving apparatus read out from the storage unit 205. For example, the control unit 201 may control the audio output unit 206 to output an audio message indicating the charging state of the power receiving apparatus such as "fully charged" or "charging state is state 1". In this case, when the charging state of the power receiving apparatus is a full charging state, the control unit 201 may control the audio output unit 206 to output "beep, beep".

Note that even when the power receiving apparatus 102b or 102c placed on the power supply area 103 has been moved, the power supply apparatus 101 executes the display process shown in FIG. 4 and the exception process shown in FIG. 5 described above as in the power receiving apparatus 102a.

FIG. 6 is a table showing an example of the apparatus IDs, pieces of position information, and charging states, which are stored in the storage unit 205 in association with each other in step S405 in FIG. 4.

In the example of FIG. 6, it is detected that the three power receiving apparatuses 102a to 102c are placed on the power supply area 103, and the ID assignment unit 210 respectively assigns apparatus IDs "A", "B", and "C" to these power receiving apparatuses 102a to 102c. In this embodiment, as shown in FIG. 6, pieces of position information detected by the position detection unit 209 and the charging states detected by the charging state detection unit 207 are stored in association with the apparatus IDs. Note that each position information detected by the position detection unit 209 is stored as coordinates in the storage unit 205.

Thus, the moved distance calculation unit 212 calculates a moved distance of the moved power receiving apparatus based on coordinates before the movement of the power receiving apparatus 102 (coordinates stored in the storage unit 205) and those after the movement (coordinates which are detected by the position detection unit 209 after the coordinates are stored in the storage unit 205). Also, when the charging state of the apparatus ID "A" is, for example, "state 1" in FIG. 3, "state 1" as the charging state is stored in the storage unit 205.

As described above, when the power supply apparatus according to this embodiment detects a motion of a power receiving apparatus, it detects a charging state of the power receiving apparatus, and displays the detected charging state of the power receiving apparatus. For this reason, for example, even when a plurality of power receiving apparatuses simultaneously receive electric power from the power supply apparatus, the user can confirm the charging state of a desired power receiving apparatus by moving that apparatus.

When a plurality of power receiving apparatuses have been moved, the charging state of one of power receiving apparatuses having moved distances equal to or larger than the predetermined distance, that is, the charging state of a power receiving apparatus having a largest moved distance, is displayed. For this reason, even when power receiving apparatuses such as mobile phones, which vibrate in response to mail reception or alarm settings, simultaneously receive electric power, the user can confirm the charging state of a desired power receiving apparatus by moving that apparatus.

Other Embodiments

The power supply apparatus according to the present invention is not limited to the power supply apparatus 101 described in the above embodiment. The power supply apparatus according to the present invention can also be implemented by, for example, a system including a plurality of apparatuses.

Note that the aforementioned embodiment has exemplified the arrangement in which electric power is supplied to the power receiving apparatuses 102a to 102c which are placed to be in contact with the power supply area 103 of the power supply apparatus 101. However, when a power supply method such as a resonant magnetic coupling type or electromagnetic induction type, which can supply electric power even when the power supply apparatus 101 and power receiving apparatuses 102a to 102c are separated, is adopted, the power receiving apparatus 102 need not be in contact with the power supply area 103.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-150262, filed on Jun. 30, 2010, which is hereby incorporated by reference herein its entirety.

What is claimed is:

1. A power transmission apparatus comprising:
a power transmission unit that transmits power wirelessly;
a detection unit that detects whether a position of at least one of a first power receiving apparatus and a second power receiving apparatus is changed by more than a predetermined value while the first power receiving apparatus and the second power receiving apparatus are in an area that the power transmission unit can transmit power; and
a control unit that causes an informing unit to inform first information relating to a state of the first power receiving apparatus if a position of the first power receiving apparatus is changed by more than the predetermined value and a position of the second power receiving apparatus is not changed by more than the predetermined value while the first power receiving apparatus and the second power receiving apparatus are in the area.

2. The power transmission apparatus according to claim 1, wherein the control unit causes, based on a variation in the position of the first power receiving apparatus and a variation in position of the second power receiving apparatus, the informing unit to inform one of the first information and second information relating to a state of the second power receiving apparatus if the position of the first power receiving apparatus and the position of the second power receiving apparatus are changed by more than the predetermined value.

3. The power transmission apparatus according to claim 2, wherein the control unit causes the informing unit to inform the first information if the variation in the position of the first power receiving apparatus is more than the variation in the position of the second power receiving apparatus.

4. The power transmission apparatus according to claim 1, further comprising an obtaining unit that obtains the first information from the first power receiving apparatus that is in the area.

5. A method comprising:
transmitting power wirelessly via a power transmission unit;
detecting whether a position of at least one of a first power receiving apparatus and a second power receiving apparatus is changed by more than a predetermined value while the first power receiving apparatus and the second power receiving apparatus are in an area that the power transmission unit can transmit power; and causing an informing unit to inform first charging information relating to a state of the first power receiving apparatus if a position of the first power receiving apparatus is changed by more than the predetermined value and a position of the second power receiving apparatus is not changed by more than the predetermined value while the first power receiving apparatus and the second power receiving apparatus are in the area.

6. A non-transitory storage medium storing a program, wherein the program causes a computer to execute a method, the method comprising:

transmitting power wirelessly;

detecting whether a position of at least one of a first power receiving apparatus and a second power receiving apparatus is changed by more than a predetermined value while the first power receiving apparatus and the second power receiving apparatus are in an area that the power transmission unit can transmit power; and causing an informing unit to inform first information relating to a state of the first power receiving apparatus if a position of the first power receiving apparatus is changed by more than the predetermined value and a position of the second power receiving apparatus is not changed by more than the predetermined value while the first power receiving apparatus and the second power receiving apparatus are in the area.

7. The power transmission apparatus according to claim 1, wherein the first information includes information relating to a battery that is charged by the first power receiving apparatus.

8. The power transmission apparatus according to claim 1, wherein the control unit does not cause the informing unit to inform the first information if the first power receiving apparatus is not in the area.

9. The power transmission apparatus according to claim 1, wherein the control unit does not cause the informing unit to inform the first information before the position of the first power receiving apparatus is changed by more than the predetermined value while the first power receiving apparatus is in the area.

10. The power transmission apparatus according to claim 1, wherein the control unit causes the informing unit to inform second information relating to a state of the second power receiving apparatus if the position of the second power receiving apparatus is changed by more than the predetermined value and the position of the first power receiving apparatus is not changed by more than the predetermined value while the first power receiving apparatus and the second power receiving apparatus are in the area.

11. The power transmission apparatus according to claim 1, wherein the first information includes information relating to a battery that is connected to the first power receiving apparatus.

* * * * *